United States Patent [19]

Barker et al.

[11] Patent Number: 4,781,521
[45] Date of Patent: Nov. 1, 1988

[54] ORIENTING DEVICE AND METHOD

[75] Inventors: Reese H. Barker, Ogden; Jack W. Crowther, Midvale, both of Utah

[73] Assignee: Deseret Medical, Inc., Franklin Lakes, N.J.

[21] Appl. No.: 73,376

[22] Filed: Jul. 13, 1987

Related U.S. Application Data

[63] Continuation of Ser. No. 800,941, Nov. 22, 1985, abandoned.

[51] Int. Cl.$^4$ .............................................. B65G 47/24
[52] U.S. Cl. .................................... 414/754; 198/381; 209/540; 414/780; 414/781; 414/786
[58] Field of Search ................ 198/381; 209/540, 544; 29/468; 414/754, 780, 781, 758, 764, 786

[56] References Cited

U.S. PATENT DOCUMENTS

| | | | |
|---|---|---|---|
| 3,253,735 | 5/1966 | Brown et al. | 198/381 X |
| 3,662,457 | 5/1972 | Gores | 414/754 X |
| 4,315,366 | 2/1982 | Palmer | 198/381 X |

Primary Examiner—Robert J. Spar
Assistant Examiner—Janice Krizek
Attorney, Agent, or Firm—Aaron Passman

[57] ABSTRACT

Disclosed is an apparatus and method of orienting a cylinder with an oblique end such that the slant of same faces a preferred direction. To this end, a special fixture is used which includes a central axial bore having a cylindrical surface which engages in bearing-like fashion with the oblique-ended cylinder. On opposite sides of the bore, are a magnet for imposing a magnetic field across the bore and across therefrom a dowel pin stop. The magnetic field acts to rotate the oblique-ended cylinder about the common axis of the bore and cylinder into a generally preferred position wherefrom the oblique-ended cylinder can come to its final resting position against the dowel pin stop. The method for using this fixture requires the alignment of the axis of the fixture and the cylinder, the moving of the two together engaging their cylindrical bearing parts to permit controlled rotary motion under the influence of magnetism and the abutting against a stop which sets the slanted portion of the oblique ended cylinder in a precise position.

10 Claims, 3 Drawing Sheets

ORIENTING DEVICE AND METHOD

This is a continuation of application Ser. No. 800,941 filed Nov. 22, 1985, now abandoned.

BACKGROUND OF THE INVENTION

This device relates to an apparatus and method for using same in connection with positioning a cylinder having an oblique end whereby the slant of that end is oriented relative to the rest of the cylinder in a predetermined plane. Where the rotary position of the cylinder is not critical and speed as well as accuracy is not required, each cylinder can be positioned manually with respect to some type of fixture or jig. In a high speed operation cylinders with oblique ends have to be oriented precisely and the cylinders have to be positioned quickly in order for an automatic transfer mechanism to move into position for further assembly or operations. It is necessary to have an automatic orienting device which is simple and foolproof as well as accurate and reliable. The possible uses for such an apparatus are myriad including quality control, automatic assembly, alignment for measurement, ease of handling small components and the like. Heretofore, high-speed and accurate handling of cylindrical members with obliquely fashioned ends has been a manual operation or an inaccurate automatic technique.

SUMMARY OF THE DISCLOSURE

The apparatus disclosed herein includes a simple fixture having a hollow cylindrical inner surface which is designed for sliding mating engagement with the outer cylindrical surface of the oblique ended cylinder. The cylindrical mating surfaces of the fixture and work piece are designed to permit rotary and axial sliding movement relative to one another for ease of use. In the preferred embodiment, the fixture is stationary and the cylindrical member with an oblique end is moved along the common axis into engagement with that fixture. In its simplest form, the movement is caused by gravity acting upon the oblique-ended cylinder. Within the stationary fixture there is along one side thereof a magnet which imposes a magnetic field across the hollow of the fixture whereby axial sliding movement of the cylinder into and through the magnetic field will cause the oblique end thereof having greater mass to be rotated about its axis during toward the magnet. Thus, it can be seen that the magnet acts to preliminarily orient the oblique-ended cylinder such that the slant thereof faces away from the magnet.

On the side of the fixture opposite where the magnet is is a transversely oriented pin positioned to engage the slant of the obliquely-ended cylinder and in a ramp-like manner precisely sets the final rotary orientation of the obliquely-ended cylinder relative to its fixture. It can be appreciated that the two-step procedure wherein the magnetic field first roughly orients the obliquely-ended cylinder relative to the fixture and then the pin precisely positions the obliquely-ended cylinder relative to the fixture are essential to providing the speed and accuracy necessary for the final relationship between them. In an automatic assembly process, the oriented obliquely-ended cylinder and its fixture can be moved to another location wherein further operations relative to the positioned obliquely-ended cylinder can be accurately performed. In particular, the orientation of the cylinder is now known relative to the fixture such that the location of any part of the cylinder is established for purposes of further work.

The method of practicing the disclosed technique includes the steps of aligning the obliquely ended cylinder and the fixture along a common axis then moving the obliquely-ended cylinder into the hollow interior of the fixture while engaging cylindrical surfaces of each to support rotary and sliding motion therebetween. Thereafter rotating the cylinder relative to the fixture in response to the pull of a magnetic field on the major distal mass of the oblique end, and finally setting the slanted portion of the oblique end against a stop positioned within the hollow of the fixture across from the magnetic field.

DETAILED DESCRIPTION OF THE DRAWINGS

Figure 1:
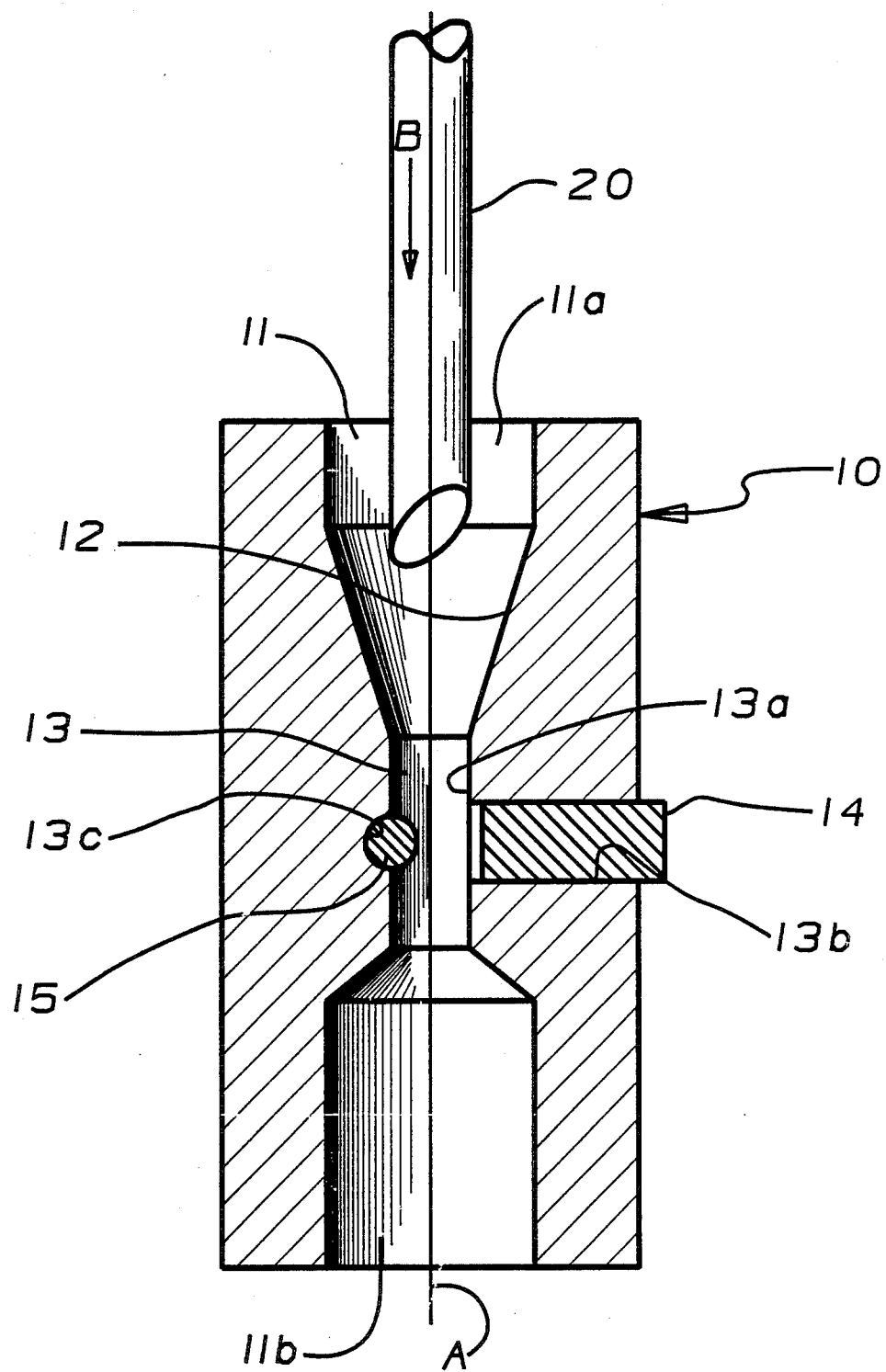
FIG. 1 is a side cross-sectional view showing the fixture of the present invention and axially aligned thereto along their common axis of both is an obliquely-ended cylinder with the slant of the oblique end at a random position (rotary angle) relative to its final position to which it will be oriented.
Figure 2:
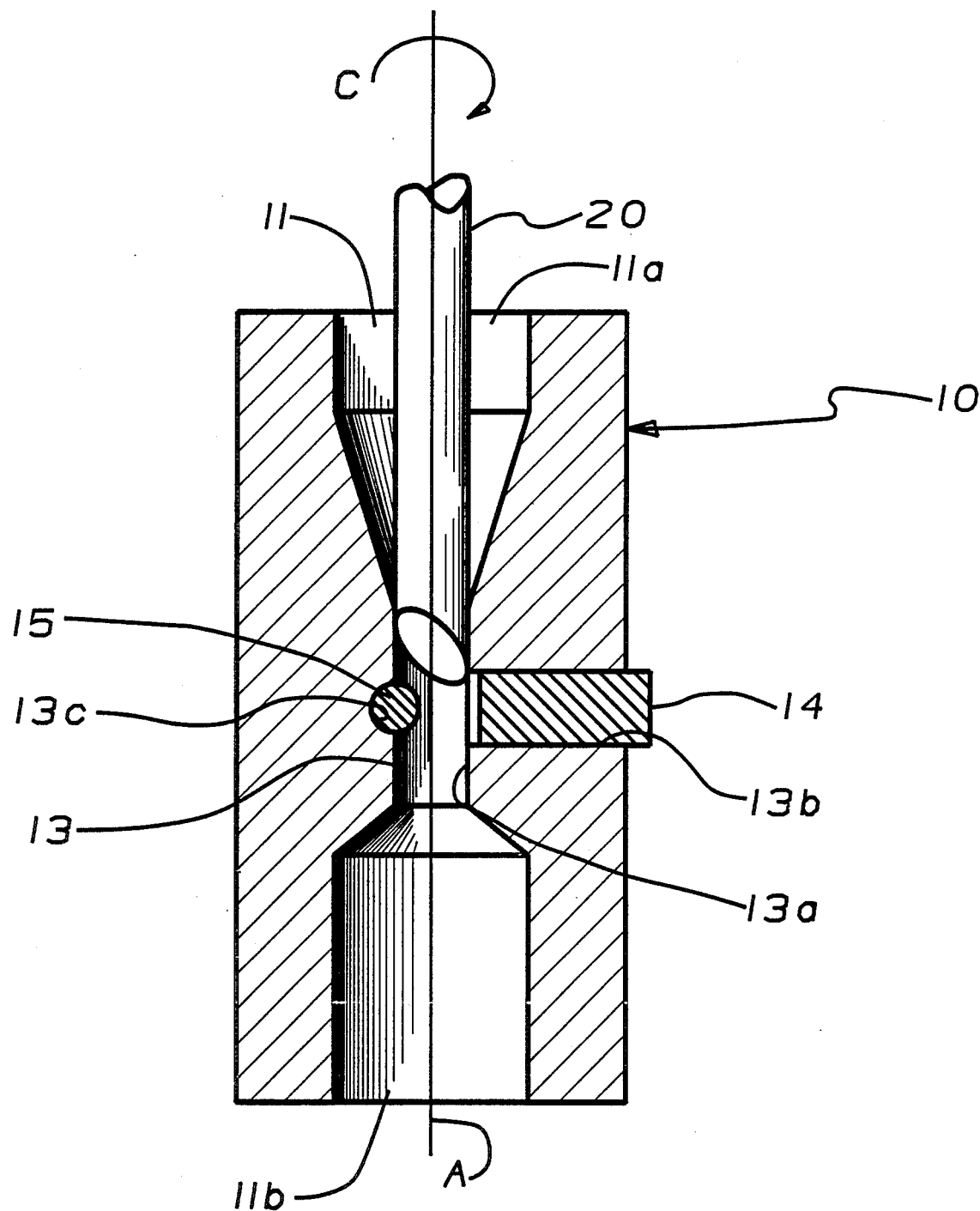
FIG. 2 shows the obliquely-ended cylinder further into the hollow of the fixture and in particular, with cylinder surfaces engaged such that the magnet has an effect and rotates the cylinder so the mass-containing oblique end thereof is closer to the magnet.
Figure 3:
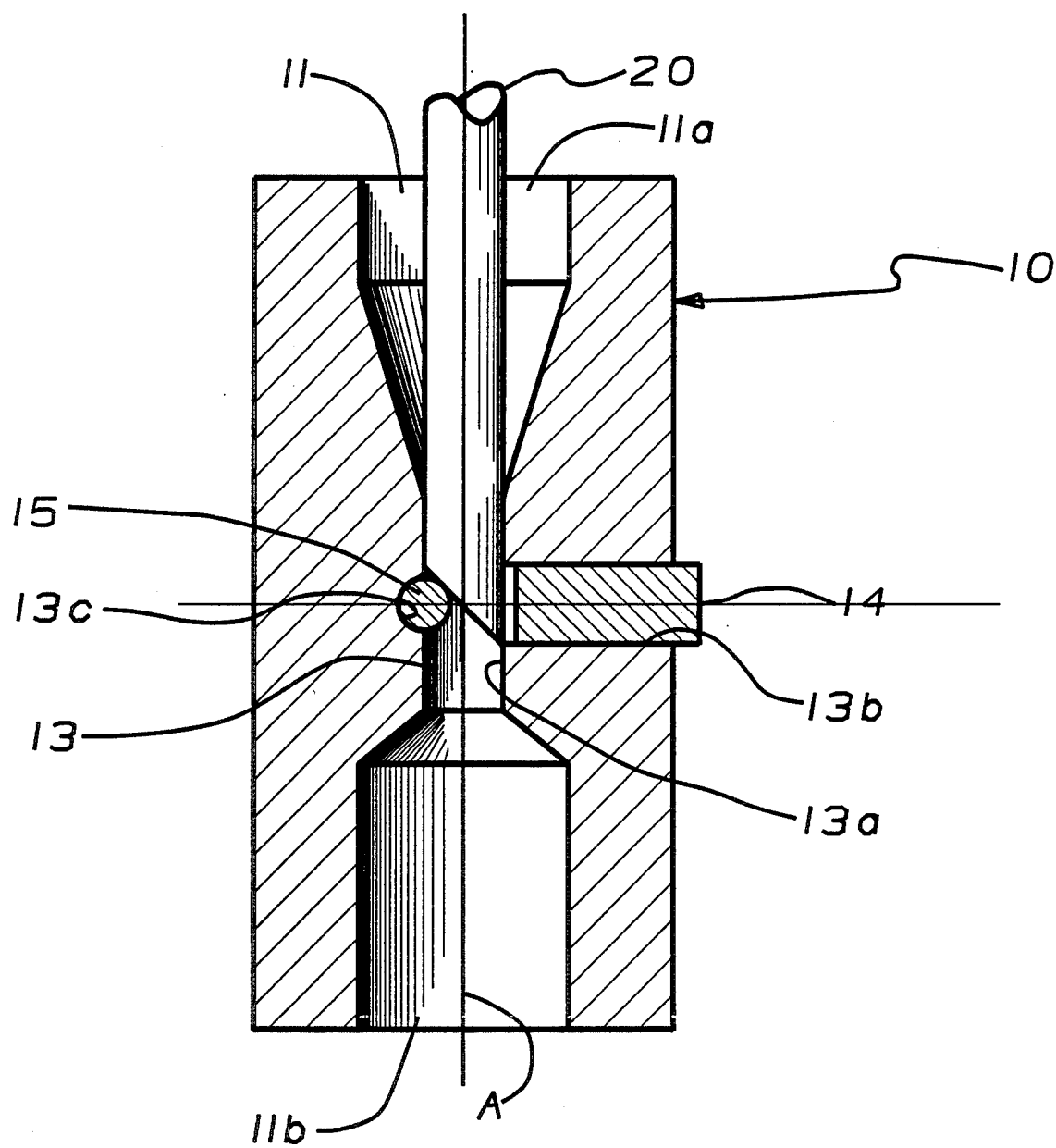
FIG. 3 shows the final resting position of the obliquely-ended cylinder wherein the slant thereof is against an engagement stop and the cylinder is fully seated within the fixture.

FIGS. 1, 2, and 3 show the fixture 10 centered about axis A. The only difference between the figures is the relative position of the obliquely-ended cylinder 20. That is to say that, in FIG. 1 the obliquely-ended cylinder 20 is axially aligned for entry into fixture 10. In FIG. 2, the obliquely-ended cylinder has entered fixture 10 and is almost to its seating position. In FIG. 3, the obliquely-ended cylinder 20 has reached its seated position in the fixture 10. The referenced numerals are the same in all the figures.

Turning now to FIGS. 1, 2, and 3 the fixture 10 is hollowed and has a passage 11 extending therethrough with an inlet 11a and an outlet 11b. In the Figures the inlet 11a is shown at the top and the outlet 11b at the bottom. This positioning has nothing to do with the invention or the disclosure except to the extent that gravity is used to move the cylinder 20 along axis A. Inlet 11a extends to an inlet taper 12 which narrows the inlet passage 11a down to a central axial bore 13 in a funnel-like manner, and taper 12 can be used to axially align cylinder 20 and fixture 10. Central axial bore 13 has a cylindrical surface 13a wherein there is a magnet 14 on one side and a transverse dowel pin stop 15 on the other. Magnet 14 is located in an external recess 13b in the side of fixture 10. The positioning of magnet 14 is such that it is proximate to the cylindrical surface 13a of central axial bore 13 whereby the magnetic field extends into the central axial bore 13 sufficiently to exert a force on the cylinder 20 without retaining same from further axial movement. Opposite the magnet 14 on the other side of central axial bore 13 is a transversely located dowel pin stop 15. The dowel pin stop 15 is positioned in a transverse opening 13c so that a small portion thereof extends across the opening of central axial bore 13. The exact position of dowel pin stop 15 and the diameter of same is a function of the particular geometry of oblique-ended cylinder 20. That is, the angle of slant, the diameter of the cylinder 20 and the force with which the cylinder and fixture are brought together. The dowel pin stop 15 is a simple press fit into a transverse hole drilled through fixture 10.

FIG. 1 shows the oblique-ended cylinder 20 as it is moving along axis A toward central axial bore 13. Arrow B shows the direction of the travel of oblique-ended cylinder 20. In FIG. 2 oblique-ended cylinder 20 has moved into central axial bore 13 and the outer cylindrical surface of the oblique-ended cylinder 20 has engaged the cylindrical surface 13a of central axial bore 13 causing a bearing-like relationship. Arrow C in FIG. 2 shows the twist imposed upon oblique-ended cylinder 20 as a consequence of the magnetic field imposed by magnet 14 across the central axial bore 13. Consequently, the oblique-ended cylinder 20 has rotated in a clock-wise fashion as indicated by Arrow C from its position in FIG. 1 to its position in FIG. 2. FIG. 3 shows the final resting position of oblique-ended cylinder 20. In this figure, the slanted portion of the oblique-ended cylinder 20 sets against the dowel pin stop 15 in the only position in which oblique-ended cylinder 20 is fully seated. That is to say that, the oblique-ended cylinder 20 is oriented relative to its slanted end in but one position. This is a result of the magnetic field which first twists the oblique-ended cylinder 20 as same is slid along the axis A into central axial bore 13. The rotation of the oblique-ended cylinder 20 is controlled by the cylindrical surface 13a of central axial bore 13 as it is of the same dimension to provide a bearing support for the cylindrical end of oblique-ended cylinder 20. The greater mass of the distal portion of oblique-ended cylinder 20 is influenced by the magnetic field of magnet 14 such that the greater concentration of magnet permeable material in oblique-ended cylinder 20 is caused to be attracted to the magnet 14 rotating the cylinder 20 around as shown in FIG. 2. The final positioning of the oblique-ended cylinder 20 is a result of the last movement wherein the oblique end comes to rest against the dowel stop pin 15

As can be seen from the foregoing, the steps of operation involved in orienting the oblique-ended cylinder 20 requires aligning the axis A of the fixture 10 and the oblique-ended cylinder 20, moving them relative to one another along the axis A, engaging the cylindrical parts of each to support rotary motion therebetween rotating them relative to one another in response to the magnetic field, pulling on the major mass of the extended oblique end and the slanted portion thereof against a dowel pin to establish a precise final orientation.

While a particular arrangement has been shown and described herein, skilled artisans will no doubt appreciate that the oblique-ended cylinder 20 could be a hollow tube or not entirely cylindrical so long as there is a portion that can conjugate for supported rotary motion with the central axial bore 13. In that circumstance, however, the major diameter would have to be that cylindrical surface and all other surfaces be somewhat less than that in order to provide the requisite clearance for rotary motion. In addition, those engaging surfaces would have to be at the distal end near the oblique-ended part of the cylinder 20. Similarly, the oblique end could be faceted or less than flat so long as it is generally angular to present a portion from which to locate the cylinder. Similarly, the dowel pin stop 15 could be any kind of an abutment which would allow the oblique-ended cylinder 20 to come to a final resting position. Even the level of magnetism between the components has some range as long as there is the permitted relative axial and rotary motion.

The fixture and oblique-ended cylinder are configured to evidence a particular positioning so that the precise placement of the oblique end is relative to the fixture when they are together. Other arrangements will be obvious to those of skill in the art and what is sought to be covered by the claims which follow are the apparatus and method which take advantage of the magnet and stop for rotating and setting the cylinder into its preferred resting position in the fixture.

What is claimed:

1. An apparatus for rotatably orienting two members relative to one another during axial translation of same into engagement with one another comprising:

a first magnetic field responsive member having at least a cylindrical surface thereof and a slanted, oblique end for selected orientation, a second member having a hollow cylindrical portion for sliding, mating engagement in bearing-like relation with said cylindrical surface to axially align said first and second members while permitting relative axial sliding and rotary motion therebetween, orienting means located transverse to said hollow cylindrical portion of said second member at one side of said cylindrical portion and positioned to engage at least a part of said oblique end during relative axial sliding movement between said first and second members, and a magnetic field emanating from a magnet located at the side opposite said one side of said cylindrical portion and imposed across said hollow portion of said second member for rotating said first member toward said one side of said cylindrical portion, said magnetic field acting on said first member to also influence its axial movement.

2. The apparatus of claim 1 for rotatably orienting said members relative to one another during axial translation of same into engagement with one another wherein said first magnet responsive member is hollow.

3. The apparatus of claim 2 for rotatably orienting said members relative to one another during axial translation of same into engagement with one another wherein a part of said oblique end of said first member contacts said orienting means.

4. The apparatus of claim 1 for rotatably orienting said members relative to one another during axial translation of same into engagement with one another wherein said hollow cylindrical portion of said second member has as its proximal end a funnel-shaped opening for guiding said first member into axial alignment with said second member.

5. The apparatus of claim 1 for rotatably orienting said members relative to one another during axial translation of same into engagement with one another wherein the clearance fit of said cylindrical portion of said second member relative to said cylindrical surface of said first member is conducive to controlled axial and rotary movement of said first member.

6. The apparatus of claim 1 for rotatably orienting said members relative to one another during axial translation of same into engagement with one another wherein said magnetic field emanating from said opposite side of said cylindrical portion has strength adequate to pull a greater distal mass of said first member toward said opposite side while allowing axial movement of said first member relative to said second member.

7. The apparatus of claim 1 for rotatably orienting said members relative to one another during axial translation of same into engagement with one another wherein said orienting means is a pin positioned transverse to said hollow cylindrical portion, normal to the axis of said second member and disposed across only a part of said hollow.

8. The apparatus of claim 7 for rotatably orienting said members relative to one another during axial translation of same into engagement with one another wherein said pin is press fit into a transverse opening through said second member.

9. The apparatus of claim 1 for rotatably orienting said members relative to one another during axial translation of same into engagement with one another wherein said members are configured to evidence a particular relationship upon orientation.

10. A method of rotatably orienting two members relative to one another, wherein the first member is responsive to magnetism and has a cylindrical surface and a slanted, oblique end, the extended portion of which constitutes its major distal mass and the second member includes a hollow cylindrical portion in which a magnetic field emanates from one side of the cylindrical portion and an engagement stop opposite thereto including the following steps:

aligning the first and the second members along a common axis;

moving the first member along the common axis toward the second member;

engaging the cylindrical surface of the first member with the cylindrical portion of the second member to support rotary motion therebetween in a bearing-like relation about the aligned common axis while permitting relative axial motion between said members in response to said magnetic field;

rotating the members relative to one another and in response to the magnetic field on the major distal mass of the oblique end as same cuts the magnetic field, and running the slanted portion of the oblique end against the engagement stop for final precise positioning of one member relative to the other.

* * * * *